United States Patent [19]

Cheng et al.

[11] Patent Number: 6,035,216
[45] Date of Patent: Mar. 7, 2000

[54] DEVICE FOR RECEIVING A SIM CARD FOR PORTABLE TELEPHONE SET

[75] Inventors: Yin-Shiang Cheng, Taipei; Hsueh-Wen Sun; Long-Jyh Pan, both of Taipei Hsien, all of Taiwan

[73] Assignee: Acer Peripherals, Inc., Taiwan

[21] Appl. No.: 09/007,799

[22] Filed: Jan. 15, 1998

[30] Foreign Application Priority Data

Jun. 12, 1997 [TW] Taiwan ................................. 86209643

[51] Int. Cl.⁷ .................................................. H04Q 7/005
[52] U.S. Cl. ......................... 455/558; 455/575; 455/550; 235/475
[58] Field of Search .................................... 455/575, 558, 455/557, 90, 550; 235/475, 479

[56] References Cited

U.S. PATENT DOCUMENTS

| | | | |
|---|---|---|---|
| 5,336,877 | 8/1994 | Raab et al. | 235/475 |
| 5,418,837 | 5/1995 | Johansson et al. | 379/58 |
| 5,814,805 | 7/1996 | Reichardt et al. | 235/479 |
| 5,815,570 | 9/1995 | Hannon et al. | 379/428 |
| 5,883,786 | 12/1996 | Nixon | 361/737 |

*Primary Examiner*—Edward F. Urban
*Assistant Examiner*—Tilahun Gesesse
*Attorney, Agent, or Firm*—Pillsbury Madison & Sutro LLP

[57] ABSTRACT

A device for receiving a memory card of a portable telephone set. The memory card-receiving device includes a memory card chamber being pivoted onto the transceiver of the telephone set. An engaging mechanism is provided to engage the memory card chamber when it is inserted into an open slot, which is an opening, cut in from the end surface and the side surface. An ejector is also provided for ejecting the memory card-receiving device when the memory card chamber is disengaged.

5 Claims, 7 Drawing Sheets

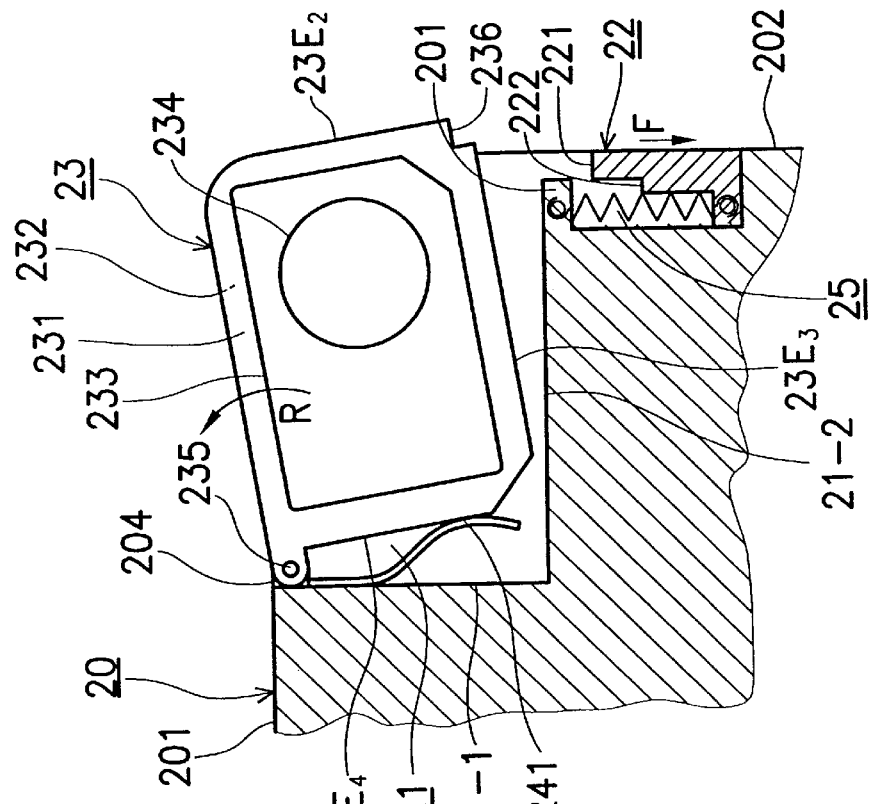
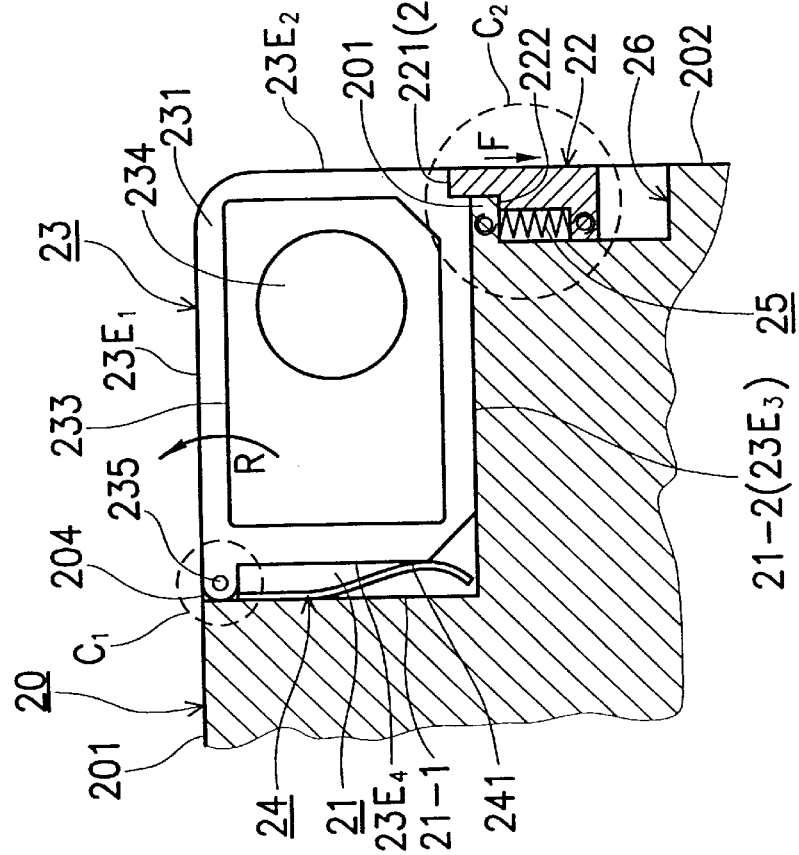
FIG. 3A
FIG. 3B

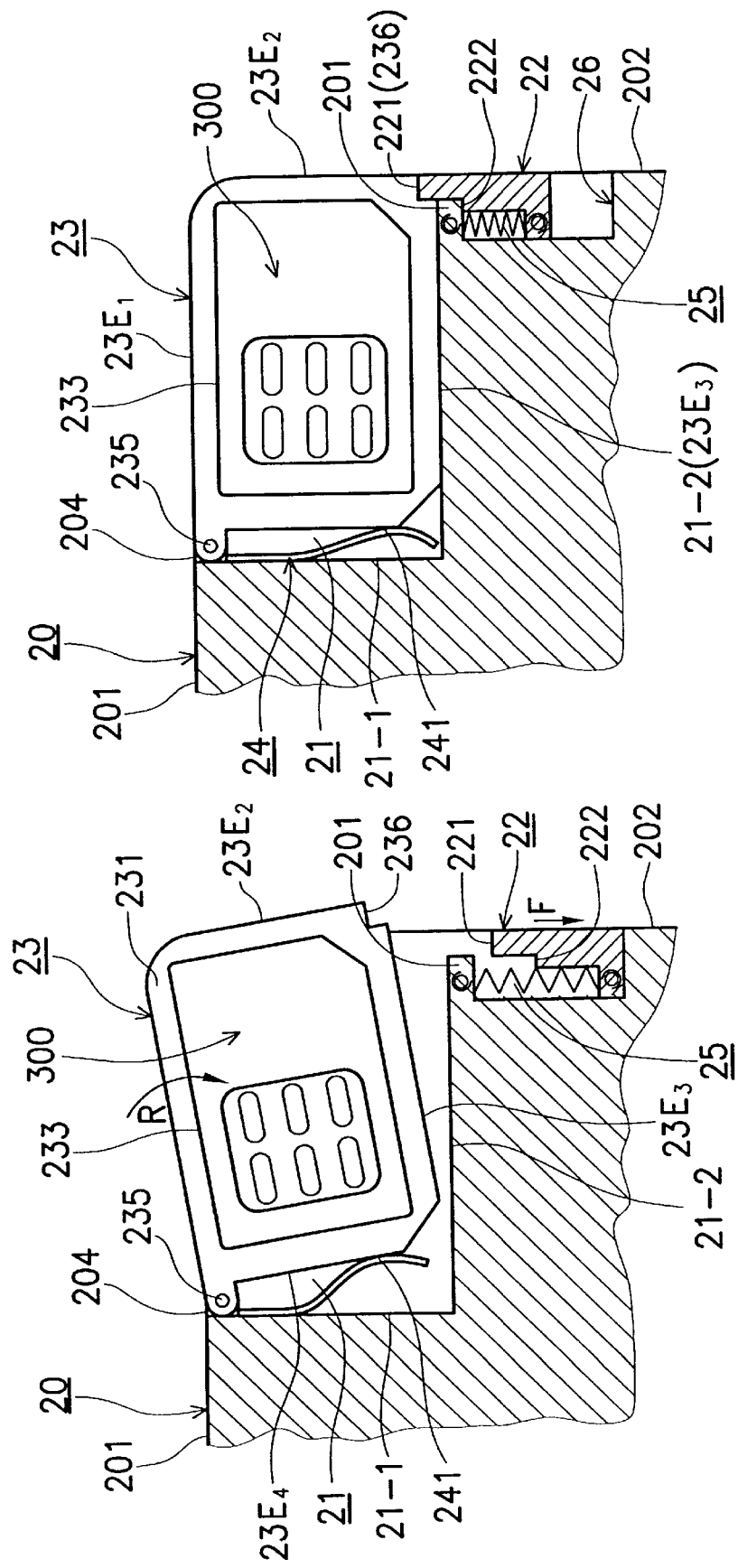

DEVICE FOR RECEIVING A SIM CARD FOR PORTABLE TELEPHONE SET

FIELD OF THE INVENTION

The present invention relates to a device for receiving a memory card. In particular, it relates to a device for receiving a SIM (Subscriber Identification Module) card of a portable telephone set, which is pivoted onto the telephone set for being swung in or out an open slot formed in the telephone set.

DESCRIPTION OF THE PRIOR ART

FIG. 1A depicts a portable telephone set 1. The portable telephone set 1 includes a portable transceiver 10 having an open slot 11, a SIM card 300 and a SIM card receiver 13. The open slot 11 is formed at the end surface 101 of the transceiver 10. An ejector knob 12 is also provided at the end surface 101 and is connected to an engaging-and-ejecting mechanism (not shown) which is received inside the transceiver 10. The SIM card 30 contains an IC chip 301 and a plurality of electrical contacts 302. The SIM card receiver 13 is used for receiving the SIM card 300 and includes a recessed seat 133 formed at the surface 131, a through hole 134 and an edge portion 135. The process of loading the SIM card 300 into the reading position is accomplished by placing the SIM card 300 on the recessed seat 133, and sliding the SIM card receiver 13 together with the SIM card 300 into the open slot 12. When the SIM card receiver 13 is inserted into the open slot 11, it is temporarily engaged with the engaging-and-ejecting mechanism and concurrently the electrical contacts 302 are electrically coupled to the internal circuitry (not shown) of the telephone set 1. The process of taking out the SIM card 300 from the telephone set 10 can be accomplished by pressing the ejector knob 12 with, for example, the tip of a pencil. When the ejector knob 12 is pressed, the engaging-and-ejecting mechanism is initiated and the SIM card receiver 13 is ejected from the open slot 12 partially, and thus the SIM card receiver 13 can be taken out by holding the edge portion 135 and pulling. The through hole 134 is designed for a user to move the SIM card 300 out of the card receiver 13 by using his or her fingers when the card receiver 13 is ejected from the transceiver 10.

FIG. 1B depicts a portable telephone set 10 with the SIM card receiver 13 being fully inserted into the open slot 12.

However, since the SIM card receiver 13 might be detached from the telephone set, when different users use different SIM cards, the SIM card receiver can potentially be lost, thereby causing inconvenience to the users.

SUMMARY OF THE INVENTION

In view of the above disadvantage, an object of the invention is to provide a device for receiving a memory card of a portable telephone set. The memory card-receiving device of the invention is connected to the transceiver and can easily be inserted into the open slot, thereby eliminating the potential of being lost and causing inconvenience.

The above object is attained by providing a memory card-receiving device which includes a memory card chamber being pivoted onto the transceiver, an engaging mechanism to engage the memory card chamber when it is inserted into the open slot, and an ejector for ejecting the receiving device when the engaging means is released.

BRIEF DESCRIPTION OF THE DRAWINGS

The present invention can be more fully understood by reference to the following detailed description and the preferred embodiment with reference made to the accompanying drawings, in which:

FIG. 3A is a partial vertical section view showing the mechanism of the memory card-receiving device of the invention while the memory card-receiving device is fully inserted into an open slot of a portable telephone set;

FIG. 3B is a partial vertical section view showing the mechanism of the memory card-receiving device of the invention while the memory card-receiving device is partially ejected from an open slot of a portable telephone set;

FIG. 4B is a partial vertical section view showing the mechanism of the memory card-receiving device of the invention while the memory card-receiving device is partially ejected from an open slot of a portable telephone set with a SIM card loaded thereon;

FIG. 4C is a partial vertical section view showing the mechanism of the memory card-receiving device of the invention while the memory card-receiving device is inserted into an open slot of a portable telephone set with a SIM card loaded thereon.

DETAILED DESCRIPTION OF THE PREFERRED EMBODIMENT

Figures 1A, 1B:
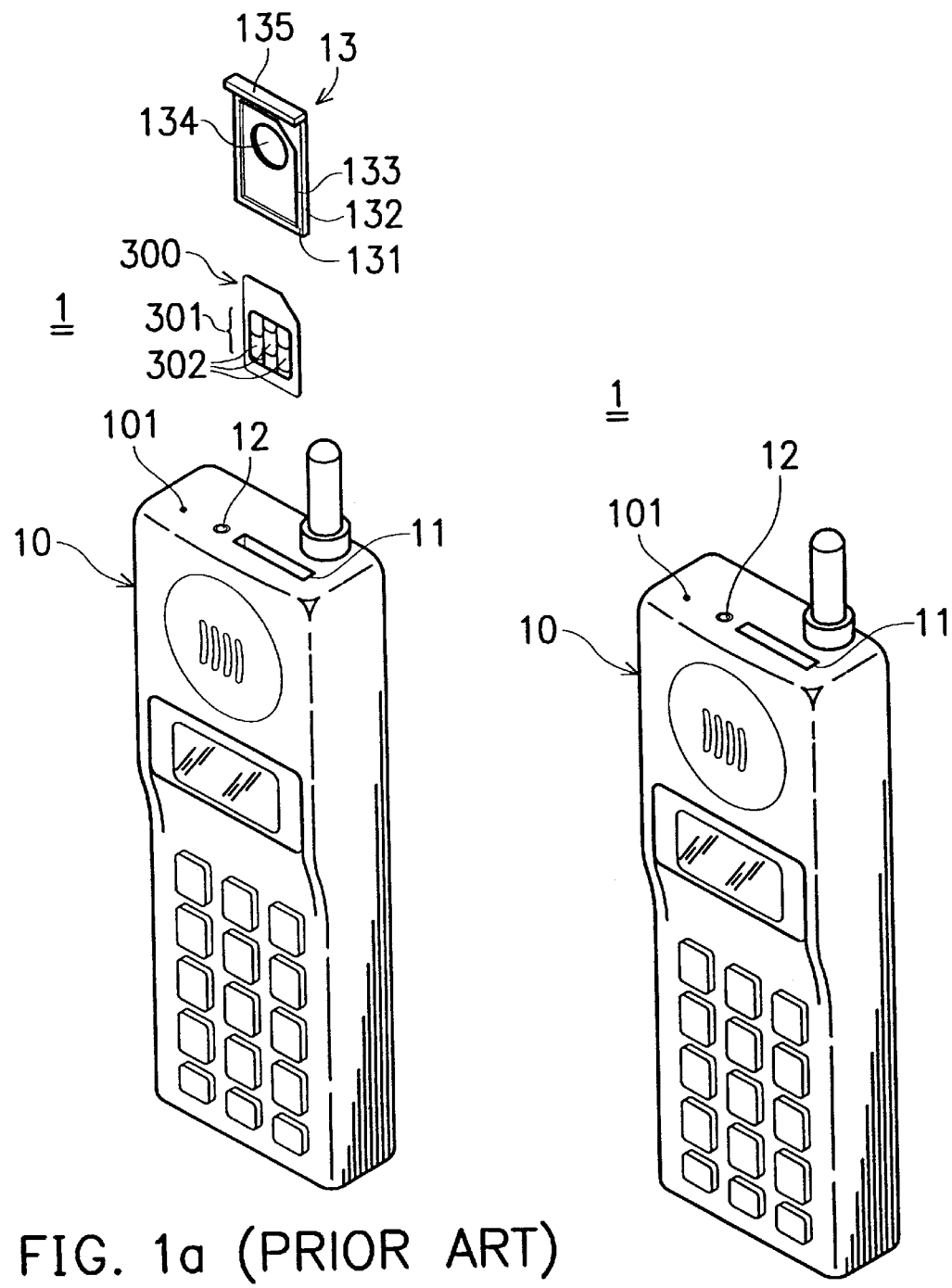
FIG. 1A is a perspective view schematically showing a SIM card receiving mechanism of a conventional portable telephone set.
FIG. 1B is a perspective view showing a SIM card receiver that has been inserted into a conventional portable telephone set.
Figure 2C:
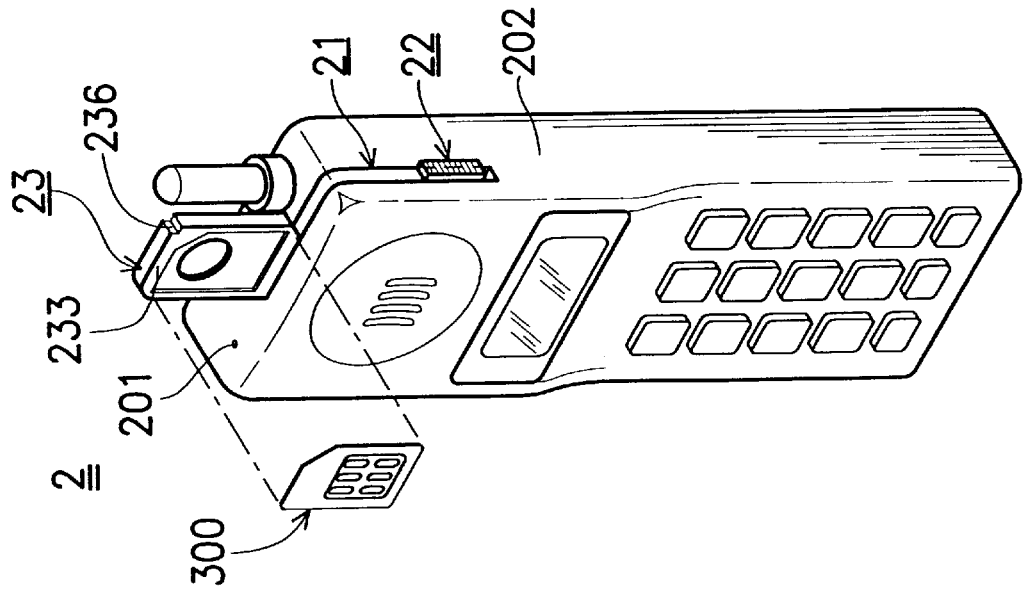
FIG. 2C is a perspective view schematically showing a state in which a memory card-receiving device of the invention is fully ejected from a portable telephone set.
Figure 2B:
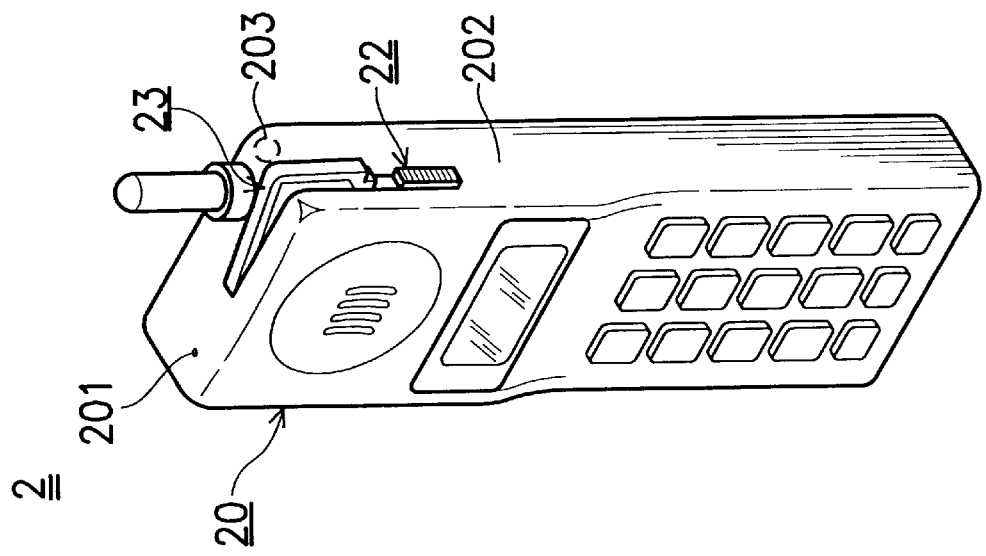
FIG. 2B is a perspective view schematically showing a state in which a memory card-receiving device of the invention is partially ejected from a portable telephone set.
Figure 2A:
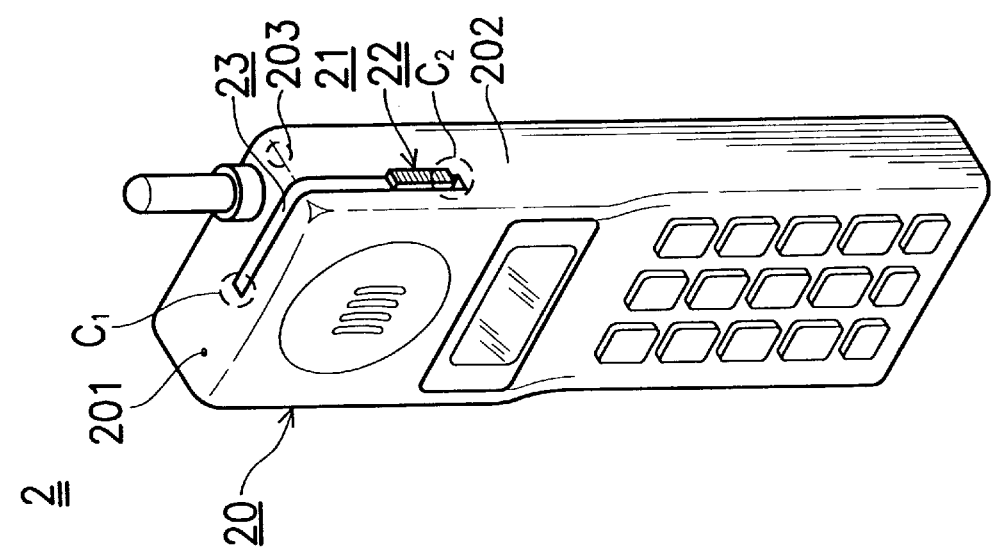
FIG. 2A is a perspective view schematically showing a state in which a memory card-receiving device of the invention is swung into a portable telephone set.

Referring to FIG. 2A, a memory card chamber 23 is inserted into an open slot 21 formed at the shoulder portion 203 of a transceiver 20. Note that in this embodiment, the open slot 21 is actually an opening cut from the shoulder portion 203 such that a rectangular space is extended from the end surface 201 and the side surface 202 into the transceiver 20.

FIG. 2B depicts the memory card chamber 23 partially ejected from the open slot 21. FIG. 2C depicts the memory card chamber 23 fully ejected from the open slot 21 so that a SIM card 300 can be loaded into the recessed seat 233. Numeral 236 denotes a cut out portion for being engaged with an engaging mechanism. The function of the cut out portion 236 will be described hereinafter.

Referring to FIG. 3A, the memory card chamber 23 includes a through hole 234, and the recessed seat 233 formed on the surface 231 for receiving a memory card, i.e., a SIM card. The memory card chamber 23 is rectangular in shape and has two long edges $23E_1$, $23E_3$, and two short edges $23E_2$, $23E_4$. The open slot 21 is a rectangular space and has substantially the same width of the memory card chamber 23 and a length longer than the length of the memory card chamber. So that when the memory card chamber is inserted into the open slot 21 horizontally the long edge 23E3 abuts with the base plane 21-2 of the open slot 21 and the other long edge 23E1 abuts with the short side surface 201 of the transceiver 20 and one of the short edge 23E2 abuts with the long side surface 202 of the transceiver 20.

As shown in FIG. 3A, the memory card chamber 23 is inserted into the open slot 21 with the cut out portion 236 being engaged with an engaging member 22. The engaging member 22 has a protruding portion 221 for engaging with the cut out portion 236 of the memory card chamber 23 and a step portion 222 for being abutted with a spring 25. The engaging member 22 and the spring 25 are slidably received in a sliding seat 26 in such a manner that when the engaging member 22 is pushed upward, the protruding portion 221 is engaged with the cut out portion 236 of the memory card chamber 23, and when the engaging member 22 is pushed downward, the cut out portion 236 is released from the protruding portion 221. A stopper 223( ) is formed for stopping the step portion 222 to restrict how far the engaging member 22 can slide in the sliding seat 26.

The memory card chamber 23 is pivoted onto the transceiver 20 at a corner position $C_1$ that is diagonally opposite to the corner position $C_2$ where the engaging member 22 is engaged with the cut out portion 236. The memory card chamber 23 is pivoted on a pivot seat 204 in which a pivot hole 235 is formed for receiving a pivot bolt (not shown) so that the memory card chamber 23 can be swung into and out of the open slot 21 in a direction indicated by the arrow R. A curved, spring strip 24 is disposed in the open slot 21 along a base plane 21-1 of the open slot 21 with one of its end fixed on the pivot seat 204 in such a manner that when the memory card chamber 23 is swung into the open slot 21 and is engaged by the engaging member 22, the curved portion 241 of the spring strip 24 is in contact with the short edge 23E4 of the memory card chamber 23. In this way, when the memory card chamber 23 is released from the engaging member 22, the spring strip 24 due to its elasticity will eject the memory card chamber 23.

Figure 3C:
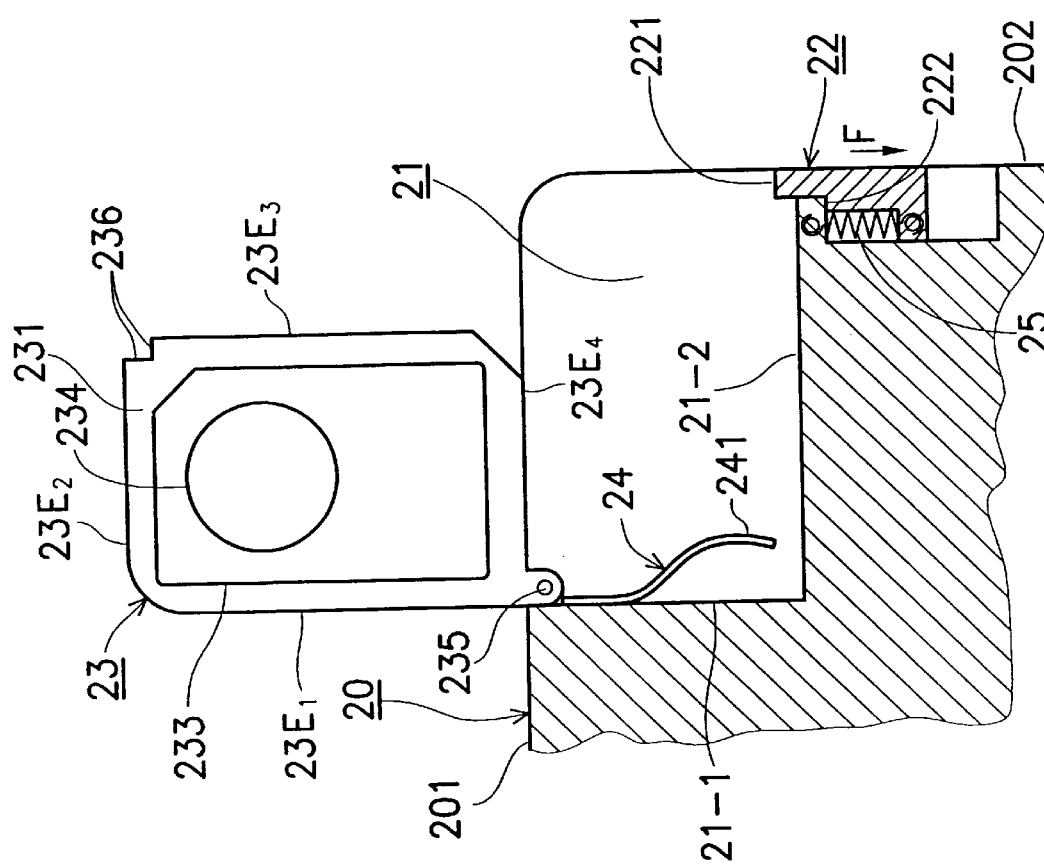
FIG. 3C is a partial vertical section view showing the mechanism of the memory card-receiving device of the invention while the memory card-receiving device is fully ejected from an open slot of a portable telephone set.

FIG. 3B shows the memory card chamber 23 is partially ejected out of the open slot 21. FIG. 3C shows the memory card chamber 23 is fully ejected from the open slot 21.

Figure 4A:
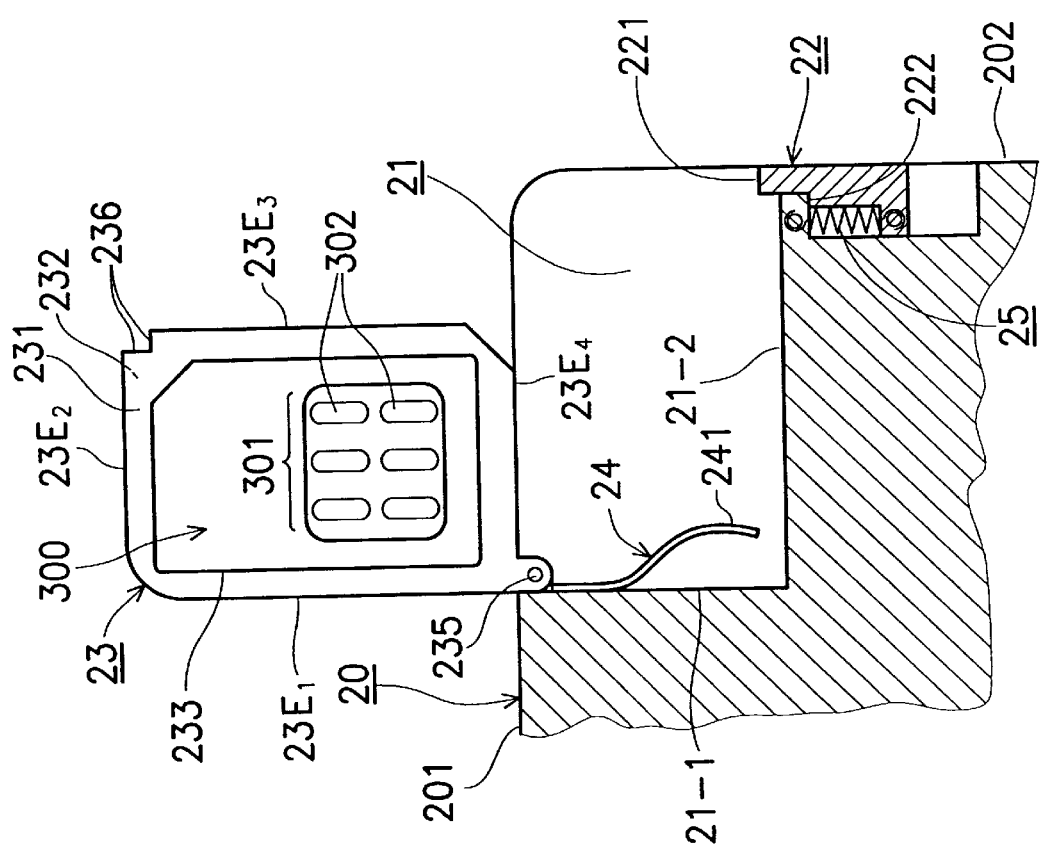
FIG. 4A is a partial vertical section view showing the mechanism of the memory card-receiving device of the invention while the memory card-receiving device is fully ejected from an open slot of a portable telephone set with a SIM card loaded thereon.

Referring to FIGS. 4A–4C, the three diagrams show that a SIM card 300 having IC chip 301 containing a plurality of electrical contacts 302 is loaded onto the recessed seat 233 of the memory card chamber 23 and the memory card chamber 23 is respectively fully ejected, partially ejected, and is engaged by the engaging member 22. When the memory card chamber 23 is engaged by the engaging member 22, the electrical contacts 302 are coupled with an internal circuitry 30 (see FIG. 5) of the transceiver 20.

Figure 5:
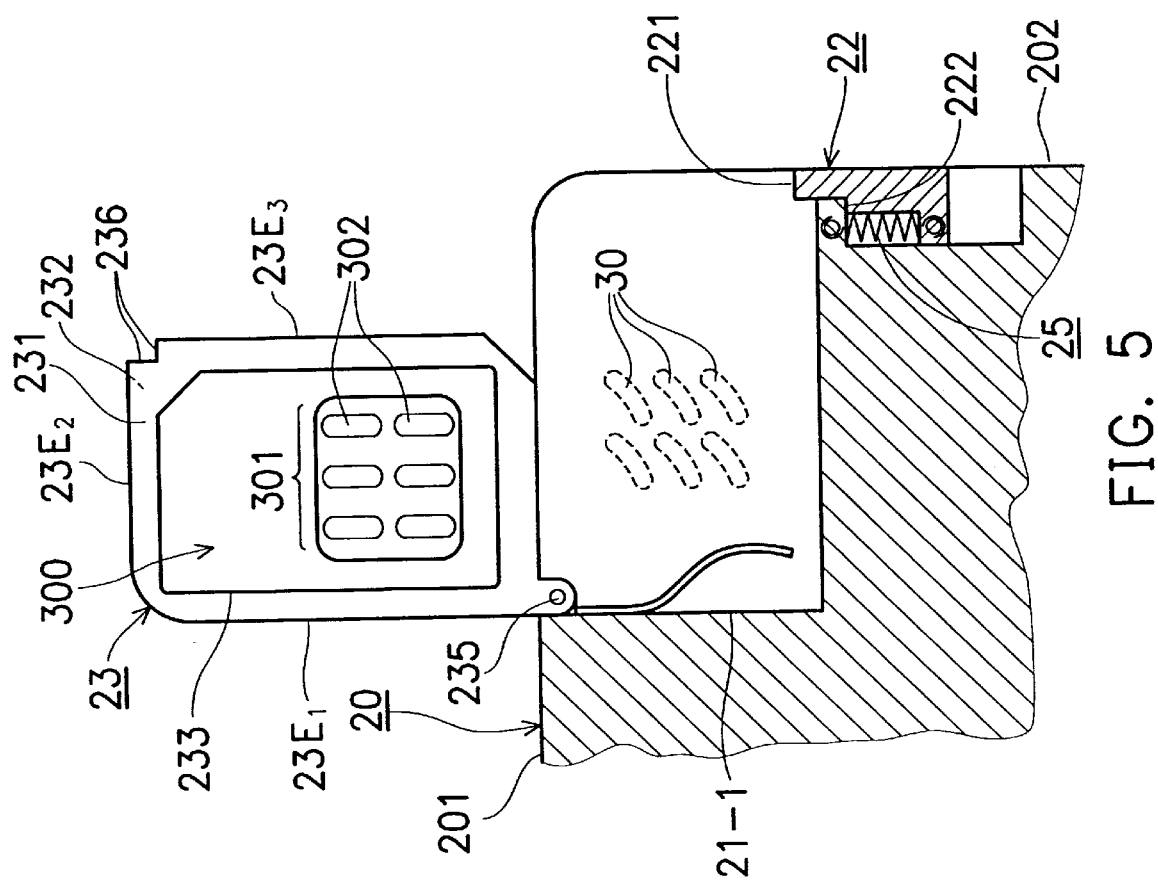
FIG. 5 is a partial vertical section view showing the location of the electrical contacts of the SIM card and the internal circuitry in the transceiver.

Referring to FIG. 5, in order to reduce wear of the electrical contacts 302 due to repeated inserting operations of different SIM cards, each contact of the internal circuitry 30 is preferably disposed at the tangent of a curve which is formed when the SIM card 300 is swung about the pivot seat 204.

What is claimed is:

1. A memory card-receiving device for being inserted into an open slot formed in an electronic device when the memory card is loaded, the memory card-receiving device comprising:

a memory card chamber for receiving the memory card, being connected to the electronic device in a manner that the memory card chamber can be freely inserted into or slid out of the open slot;

an engaging means for engaging said memory card chamber onto the electronic device when said memory card chamber is inserted into the open slot;

wherein the electronic device has a first outer surface and a second outer surface; the open slot is a cut in rectangular space extended from the second outer surface and the first outer surface and has a first base plane perpendicular to the second outer surface and a second base plane perpendicular to the first outer surface; and said memory card chamber is rectangular in shape and is pivoted at a first corner where the second outer surface and the first base plane meet, wherein said rectangular memory card chamber has a cut out portion; said engaging means is disposed at a second corner diagonally opposite to the first corner and includes an engaging member and a biasing means; said engaging member has a protruding block for engaging with the cut out portion of said memory card chamber, and said biasing means is biased when the engaging member is engaged with the cut out portion of the memory card chamber.

2. The memory card-receiving device as claimed in claim 1, wherein said biasing means is a coil spring.

3. The memory card-receiving device according to claim 1, wherein said memory card-receiving device further comprises an internal circuitry contact, wherein said internal circuitry contact has a curved shaped along a tangent of a curve formed when said memory card is swung around said first corner.

4. The memory card-receiving device according to claim 1, wherein said memory card-receiving device further comprises an ejecting means for ejecting said memory card chamber from the open slot when said engaging means is released.

5. The memory card-receiving device as claimed in claim 4, wherein said ejecting means is a curved spring strip including a curved portion, disposed in the open slot along the first base plane with one end thereof fixed on the first corner in such a manner that when the said memory card chamber is swung into the open slot and engaged by said engaging member, the curved portion comes in contact with said memory card chamber.

* * * * *